(12) United States Patent
Nishiyama et al.

(10) Patent No.: US 7,085,564 B2
(45) Date of Patent: Aug. 1, 2006

(54) RADIO COMMUNICATION SYSTEM, RADIO COMMUNICATION APPARATUS AND RADIO COMMUNICATION METHOD, AND COMPUTER PROGRAM

(75) Inventors: Fumihiro Nishiyama, Saitama (JP); Takushi Kunihiro, Tokyo (JP); Tomoya Yamaura, Tokyo (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 10/372,326

(22) Filed: Feb. 25, 2003

(65) Prior Publication Data

US 2003/0162535 A1      Aug. 28, 2003

(30) Foreign Application Priority Data

Feb. 28, 2002    (JP)    ............................. 2002-053295

(51) Int. Cl.
*H04Q 7/20*    (2006.01)
(52) U.S. Cl. ................ 455/432.1; 455/422; 455/435.1; 455/437; 455/438; 370/331; 370/332; 370/337
(58) Field of Classification Search ............. 455/432.1, 455/435.1, 435.2, 437, 438, 442, 443, 444, 455/422; 370/331, 332, 337
See application file for complete search history.

(56) References Cited

U.S. PATENT DOCUMENTS

| | | | | |
|---|---|---|---|---|
| 6,097,709 A * | 8/2000 | Kuwabara | .................... | 370/331 |
| 6,151,311 A * | 11/2000 | Wheatley et al. | ............ | 370/335 |
| 6,356,763 B1 * | 3/2002 | Kangas et al. | ............ | 455/456.1 |
| 6,711,408 B1 * | 3/2004 | Raith | ......................... | 455/440 |
| 6,728,540 B1 * | 4/2004 | DeSantis et al. | ............ | 455/437 |
| 2001/0021179 A1 * | 9/2001 | Tiedemann et al. | ......... | 370/333 |
| 2002/0105927 A1 * | 8/2002 | Holma et al. | ................ | 370/331 |

* cited by examiner

*Primary Examiner*—Steve M. D'Agosta
(74) *Attorney, Agent, or Firm*—Oblon, Spivak, McClelland, Maier & Neustadt, P.C.

(57) ABSTRACT

Under a multi-cell radio communication environment where connection between cells or TDMA frame synchronization is not established, a mobile station carries out an adjacent cell search under low power consumption. Adjacent cell information acquired through search by the mobile station is managed centered on a base station and may be provided by the base station as adjacent cell information, when the mobile station carries out the adjacent cell search. The adjacent cell information includes, for example, a TDMA frame offset between cells so that the mobile station receives a broadcast channel of the adjacent cell at appropriate timing based on the adjacent cell information and therefore does not need to perform unnecessary reception operation in the event of a handoff.

14 Claims, 10 Drawing Sheets

RADIO COMMUNICATION SYSTEM, RADIO COMMUNICATION APPARATUS AND RADIO COMMUNICATION METHOD, AND COMPUTER PROGRAM

CROSS REFERENCE TO RELATED APPLICATIONS

This application claims priority to Japanese Patent Application No. JP 2002-053295, filed on Feb. 28, 2002, the disclosure of such application being herein incorporated by reference to the extent permitted by law.

BACKGROUND OF THE INVENTION

1. Field of the Present Invention

The present invention relates to a radio communication system, a radio communication apparatus and a radio communication method, and a computer program in which a plurality of mobile stations simultaneously communicate with a base station by means of multiple accesses, in particular to a radio communication system, a radio communication apparatus and a radio communication method, and a computer program in which time division multiple access (TDMA) communication is carried out for each base station cell.

More particularly, the present invention relates to a radio communication system, a radio communication apparatus and a radio communication method and a computer program in which a mobile station performs communication according to a TDMA frame synchronized with a control channel which is transmitted to each cell from a base station; still specifically, relates to a radio communication system,. a radio communication apparatus and a radio communication method, and a computer program in which under a multi-cell radio communication environment where connection between cells or TDMA frame synchronization is not established, a mobile station carries out an adjacent cell search with low power consumption in the event of a handoff and the like.

2. Description of the Related Art

Mobile communication has originally arisen from the discovery of electromagnetic waves and subsequent to the discovery, research and development have been carried out from a need for communications with vessels, aircraft, trains and the like. Further, objects to be communicated have been expanded to cars and persons as well. It has been possible to transmit not only transmission data by means of telegraphy and telephony but also computer data and multimedia content such as images.

Recently, due to improvements in manufacturing technologies a mobile terminal has rapidly become smaller and less costly. Also an expansion of information and communication services has contributed to a personalization of mobile terminals, such as the introduction of cellular phones. Further, deregulation and liberalization of communications and reduction in communication charges have increased the number of users.

In mobile telecommunications, basically a mobile station such as an in-vehicle phone and a cellular phone finds a nearest base station and electromagnetic waves are exchanged between the mobile station and the base station. A range of communication in which electromagnetic waves from a base station can reach is referred to as "Cell". A cell is usually a circle having a predetermined radius and centered on a base station antenna. Arranging cells without a gap constitutes a communication service area.

Figure 11:
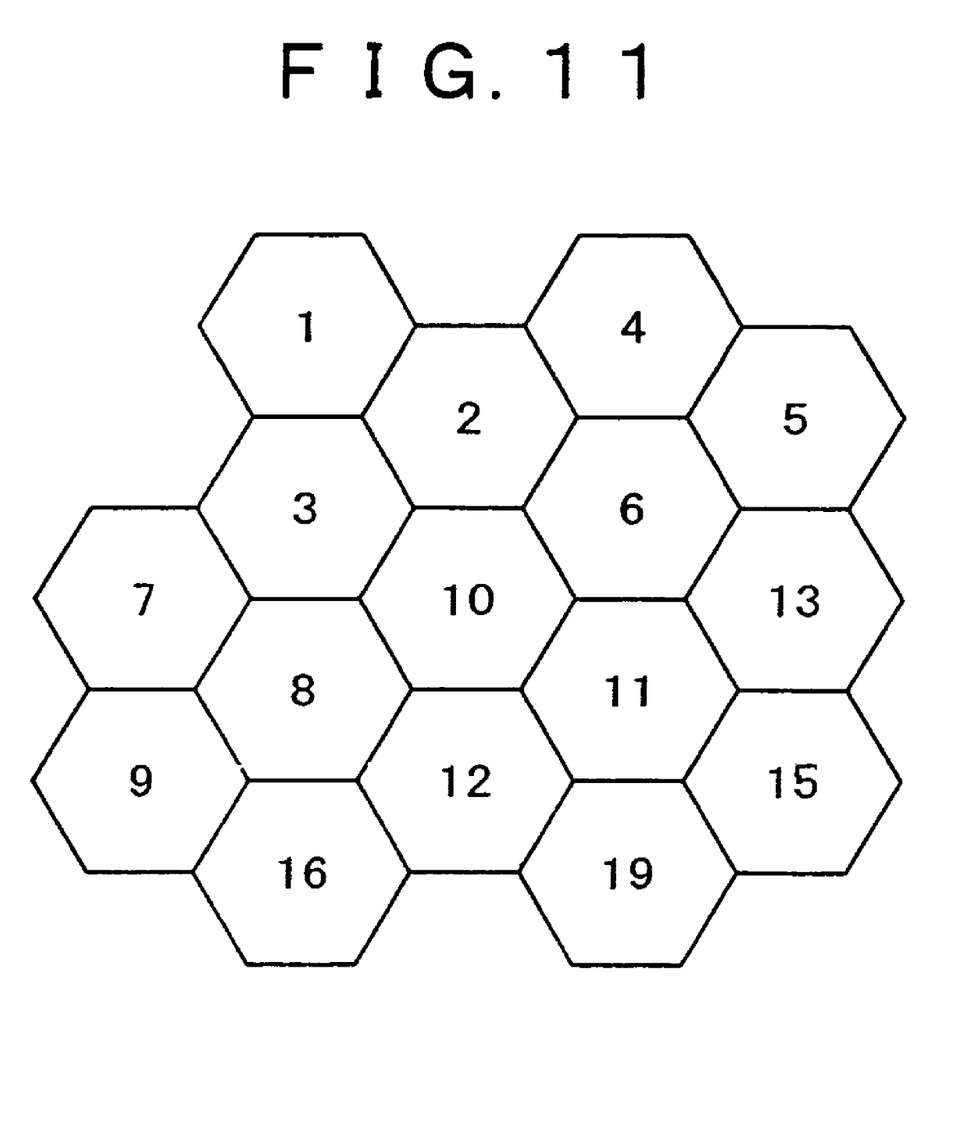
FIG. 11 is a diagram schematically illustrating a cell arrangement of a mobile radio communication system where a plurality of base stations is deployed to form a service area.

In FIG. 11, there is schematically illustrated a cell arrangement of a mobile radio communication system, as exemplified by a cellular system, where a plurality of base stations are deployed to form a service area. The service area is a multi cell structure in which the base stations (not shown) are disposed in a predetermined space interval. As shown in the figure, the plurality of cells each provided by the base stations are prepared as a continuum (or so as not to be isolated) so that a mobile station may perform communication from anywhere in the service area, whereby an expanded service area is achieved.

The reason why the mobile communication system uses cells in this manner is that there are advantages in that by allowing electromagnetic waves of a base station to reach only within its cell, another cell may use the same frequency (again) and limited frequency resources may be effectively utilized; by dividing into cells, an output of electromagnetic waves for communication is reduced so that a mobile device worn as a portable device driven by batteries may be reduced in size and in electric power, for example. Recently, according to an increase in the number of cellular phone users, cells are becoming smaller and smaller in size.

As a matter of fact, there is a plurality of mobile terminals in a cell so that the mobile terminals communicate with a base station at the same time. In other words, from the base station's point of view, it is necessary to detect what signal corresponds to what user (multi-user detection) by multiple accesses or multiplexing radio signals.

As multiple access technologies, Time Division Multiple Access (TDMA) and Frequency Division Multiple Access (FDMA) may be quoted, for example.

The TDMA is a communication system in which communication channels are divided into time slots on a time base so as to allocate different time slots to different mobile terminals performing communications at the same time; a digital system is a presumption for this type of system.

On the other hand, FDMA is a communicating system in which different frequencies are allocated to mobile terminals communicating with at the same time (that is, a frequency is allocated to each communication channel). In other words, multiple channels used for communication are arranged on a frequency base so that channels that are free are appropriately allocated. The FDMA may be applied to either analog or digital communication systems.

For example, the base station may accommodate a plurality of mobile stations within the same cell at the same time by means of a TDMA system. In this case, a TDMA frame is divided into a plurality of time domains to be allocated to uplink and downlink of each mobile station. For allocating time domains, a method of resource reservation may be employed, for example.

Further, in the FDMA system frequency channels to be used may be switched between cells so as to perform communications, thus solving a problem of interference waves from outside the cells , which occur around cell boundaries.

Within the cell, the base station periodically transmits (broadcasts) control information such as a beacon so as to perform synchronization within the cell, identification of the cell, designation of a frequency channel to be used, and the like.

On the other hand, as shown in FIG. 11, in a service area where small-sized cells are arranged without a gap, as the mobile station moves from cell to cell a base station to be connected must be changed. Such a changeover between connection base stations carried out by the mobile station is referred to as "handover" or "handoff". The smaller a cell becomes, the more often a handoff happens.

For each handoff, it is necessary for the mobile station to search with which base station to link next or to perform a cell search. For example, as the mobile station moves to a periphery of the cell, a communication quality of desired signal from the connected base station decreases (RSSI: a Received Signal Strength Indicator decreases) and interference signals from outside the cell may be received, thereby being necessary to search another base station of high communication quality. As a matter of course, the mobile station searches a cell when activating its device.

When the mobile station performs a cell search, a control channel such as a beacon (identification signal) transmitted by a base station of an adjacent cell should be received. In this case, switching a frequency channel to another frequency channel except for busy ones in the connected cell, the base station waits for a control channel of higher signal strength to be received.

For example, in a wide area cellular system, due to the presence of a backbone, a control channel may be transmitted at the same timing in all cells by cooperating among base stations and establishing synchronization. In other words, TDMA frames are synchronized between cells. In such a case, when the mobile station needs a cell search, it waits for a control channel at the same timing period as the previously connected base station so as to easily search a cell.

SUMMARY OF THE PRESENT INVENTION

However, in a small radio communication system such as a wireless LAN, it is often the case that neither connection nor synchronization between the base stations is established, a transmission timing of the control channel such as the beacon is different for each base station, and the TDMA frames are not synchronized. As a result, when the mobile station searches an adjacent cell, the mobile station must maintain a reception process until it detects the control channel, in order to receive a control channel, which may be transmitted at any time. For example, for HiperLAN/2 which is a radio LAN standard, a BCH (Broadcast Channel) which is a control channel, is transmitted every 2 milliseconds, so that the mobile station has to maintain the reception process for up to 2 milliseconds. Maintaining the reception process for 2 milliseconds constitutes a disadvantage from the viewpoint of power consumption.

The present invention has been conceived in view of a demand for a radio communication system, a radio communication apparatus and a radio communication method and a computer program which are advantageous in that communication based on time division multiple access (TDMA) may be desirably carried out for each base station cell.

There is another demand for a radio communication system, a radio communication apparatus and a radio communication method and a computer program which are advantageous and in which a mobile station may suitably perform communication according to a TDMA frame synchronized by a control channel which is transmitted from a base station for each cell.

There is still another need for a radio communication system, a radio communication apparatus and a radio communication method and a computer program which are advantageous and in that under a multi-cell radio communication environment where connection between cells or TDMA frame synchronization is not established, a mobile station carries out an adjacent cell search under low power consumption in the event of a handoff and the like.

The present invention has been conceived in consideration of the above mentioned needs. A first preferred embodiment of the present invention presents a multi-cell and multi-user radio communication system in which cells each having a base station capable of communicating are disposed adjacent to or contiguous to each other, and the base station collects adjacent cell information from each mobile station within its cell so as to manage the adjacent cell information and provides the mobile station with the adjacent cell information collected within the cell.

However, what is referred to herein as "system" is that a plurality of apparatuses (or functional modules for realizing specific functions) are logically gathered regardless of whether each apparatus or functional module is provided within a single casing.

In each cell, communications are carried out by means of a time division multiple access system. Further, each base station transmits intra-cell control information such as a BCH (Broadcast Channel) for each time division multiple access frame period of its own cell. The adjacent cell information may include not only base station identification information of an adjacent cell and occupied frequency channel information but also a timing offset value of time division multiple access frames of its own cell and the adjacent cell.

Therefore, according to the radio communication system of the first preferred embodiment of the present invention, when an adjacent cell search is to be performed in the event of a handoff or because of a reduction in communication quality due to other reasons, the mobile station may effectively carry out the reception process of the intra-cell control information from the adjacent cell by using a reception timing which is determined from the timing offset value included in the adjacent cell information previously acquired from the base station. Consequently, the mobile station does not have to perform an unnecessary reception operation during the handoff, thus being effective to reduce the power consumption of the mobile station.

A second preferred embodiment of the present invention presents a radio communication apparatus or a radio communication method for operating as a base station under a radio communication environment where intra-cell communications are carried out by means of a time division multiple access system, the apparatus or the method including: an adjacent cell information reception means or step for receiving adjacent cell information notified by each mobile station within a cell; an adjacent cell information management means or step for managing the received adjacent cell information; and an adjacent cell information provision means or step for providing an adjacent cell information stored in the adjacent cell information management means or step to a mobile station within the cell.

The radio communication apparatus operating as a base station transmits a control channel including intra-cell control information for each time division multiple access frame period of its own cell. Conversely, each mobile station in the cell receives the periodic control channel from the base station so as to achieve synchronization in the cell, thus being capable of performing a data transmission operation according to the time division multiple access frame in the cell.

In a multi-cell radio communication system in which connection or synchronization between the base stations is not established, each cell is operated by means of a unique time division multiple access frame so that base stations are not capable of knowing the timing of one another. In such a case, the adjacent cell information may include not only base station identification information and using frequency channel information of an adjacent cell and the like, but also a timing offset value of time division multiple access frames of its own cell and the adjacent cell.

The adjacent cell information management means or the adjacent cell information management step centralizes, within the cell, the management of the adjacent cell information notified by each mobile station within the cell. When adjacent cell information for the same adjacent cell is received from a plurality of mobile stations, the adjacent cell information may be updated to be the latest or the adjacent cell information whose predetermined time after the last reception has elapsed may be discarded so as to always maintain effective adjacent cell information. For a base station having many mobile stations in its cell, if a frequency of an adjacent cell search performed by each accommodated mobile station is low, the number of times of adjacent cell searches performed within the whole cell is relatively large. Consequently, the base station can frequently update the adjacent cell information so as to improve reliability of the adjacent cell information. Further, the adjacent cell information provision means or the adjacent cell information provision step may avoid transmission of useless or unnecessary adjacent cell information that is useless data transmitting operation or waste of communication resources.

The base station is notified of the adjacent cell information acquired at each mobile station so that the data management may be centralized at the base station. The adjacent cell information provision means or the adjacent cell information provision step may broadcast the adjacent cell information within the cell, or transmit the adjacent cell information to the mobile station in response to an adjacent cell search notice from the mobile station in the cell or other types of requests.

As a result, on the mobile station side, when an adjacent cell search has to be performed in the event of a handoff or because of a reduction in communication quality due to other reasons, the reception process of the intra-cell control information from the adjacent cell may be effectively carried out by using a reception timing which is determined from the timing offset value included in the adjacent cell information previously acquired from the base station.

In addition, a third preferred embodiment of the present invention presents a radio communication apparatus or a radio communication method for operating as a mobile station under a radio communication environment where intra-cell communications are carried out by means of a time division multiple access system, the apparatus or the method including:

an adjacent cell search means or step for searching an adjacent cell;

an adjacent cell information notification means or step for notifying a base station of the adjacent cell information acquired as a result of the adjacent cell search; and an adjacent cell information acquisition means or step for acquiring the adjacent cell information from the base station.

The base station transmits a control channel including intra-cell control information for each period of time division multiple access frame. Conversely, each mobile station in the cell receives the periodic control channel from the base station so as to achieve synchronization in the cell, thus performing a data transmission operation according to the time division multiple access frame in the cell. In a multi-cell radio communication system in which connection or synchronization between the base stations is not established, each cell is operated by means of a unique time division multiple access frame so that the base stations are not capable of knowing the timing of one another.

In such a case, the adjacent cell information may include not only base station identification information and using frequency channel information of an adjacent cell and the like, but also a timing offset value of time division multiple access frames of its own cell and the adjacent cell. Each radio communication apparatus operating as a mobile station is caused to notify the base station of the adjacent cell information so that the adjacent cell information may be shared in the same cell via the base station. For a cell containing many mobile stations therein, if a frequency of an adjacent cell search performed by each accommodated mobile station is low, the number of times of adjacent cell searches performed within the whole cell is relatively large. Consequently, the base station can frequently update the adjacent cell information so as to improve reliability of the adjacent cell information.

By making use of time when the apparatus is activated, time when the quality of communication with the base station is low, or a free area in time division multiple access frames, the adjacent cell search means or the adjacent cell search step tries the reception process of the control channel transmitted from the adjacent cell or the adjacent cell search. In other words, each mobile station previously acquires the adjacent cell information as a precaution for a case of a handoff and the like.

In addition, the reception process of the control channel from the adjacent cell may be carried out by using a reception timing which is determined from the timing offset value included in the adjacent cell information previously acquired by means of the adjacent cell information acquisition means or the adjacent cell information acquisition step.

Thus, according to the radio communication apparatus or the radio communication method of a third preferred embodiment of the present invention, when the mobile station has to perform an adjacent cell search in the event of a handoff or because of decreased communication quality due to other reasons, the reception process of the intra-cell control information from the adjacent cell may be effectively carried out by using a reception timing which is determined from the timing offset value included in the adjacent cell information previously acquired from the base station. Consequently, the mobile station does not have to perform an unnecessary reception operation in the event of a handoff, thus being effective to reduce the power consumption of the mobile station.

The management of the adjacent cell information collected in the cell is centralized at the base station, and is shared by each mobile station in the cell. The base station may broadcast the control channel including adjacent cell information therein so that the adjacent cell information acquisition means or the adjacent cell information acquisition step may obtain the control channel at each mobile station. Alternatively, the adjacent cell information acquisition means may request the base station to transmit the adjacent cell information in the event of handoff or corresponding to the decrease in quality of communication with other base stations.

A fourth preferred embodiment of the present invention presents a computer program described in computer-readable form so as to execute a process for operating on a computer system as a base station under a radio communication environment where intra-cell communications are carried out by means of a time division multiple access system, the program including: an adjacent cell information reception step for receiving adjacent cell information notified by each mobile station within a cell; an adjacent cell information management step for managing the received adjacent cell information; and an adjacent cell information provision step for providing an adjacent cell information stored in the adjacent cell information management step to a mobile station within the cell.

Furthermore, a fifth preferred embodiment of the present invention presents a computer program described in computer-readable form so as to execute a process for operating on a computer system as a mobile station under a radio communication environment where intra-cell communications are carried out by means of a time division multiple access system, including: an adjacent cell search step for searching an adjacent cell; an adjacent cell information notification step for notifying a base station of the adjacent cell information acquired as a result of the adjacent cell search; and an adjacent cell information acquisition step for acquiring the adjacent cell information from the base station.

The computer program according to the fourth or the fifth preferred embodiment of the present invention defines a computer program described in a computer-readable form so as to achieve a predetermined process on a computer system. In other words, the computer program with respect to the fourth or fifth preferred embodiment of the present invention is installed in the computer system so that the computer system permits realization of a cooperative effect resulting in advantages that are similar to the radio communication apparatus or the radio communication method according to the second or the third preferred embodiments.

As described above, according to the preferred embodiment of the present invention, a radio communication system, a radio communication apparatus and a radio communication method and a computer program are provided in which a mobile station performs an adjacent cell search with low power consumption for hand off, for example, even under a multi-cell radio communication environment where connection or synchronization of TDMA frames between cells is not established between cells.

In the radio communication system according to the present invention, management of adjacent cell information acquired by mobile stations is centralized in a base station. The base station may provide the mobile station with the information of an adjacent cell when the mobile station performs an adjacent cell search. The adjacent cell information may include a TDMA frame offset between cells and the like. Thus the mobile station may receive a broadcast channel of the adjacent cell at an appropriate timing based on the adjacent cell information. As a result, the mobile station does not need to perform an unnecessary reception operation in the event of handoff, thus constituting an effective measure for reducing the power consumption of the mobile station.

Further objects of the present invention, as well as the characteristics and advantages thereof, will become apparent by reference to the following detailed description of the embodiments of the present invention and the accompanying figures.

BRIEF DESCRIPTION OF THE DRAWINGS

The above and other features and advantages of the present invention will become more apparent from the following description of the presently exemplary preferred embodiments of the present invention taken in conjunction with the accompanying drawings, in which.

DESCRIPTION OF THE PREFERRED
EMBODIMENTS OF THE INVENTION

Preferred embodiments of the present invention will be described in detail below, with reference to the attached drawings.

Figure 1:
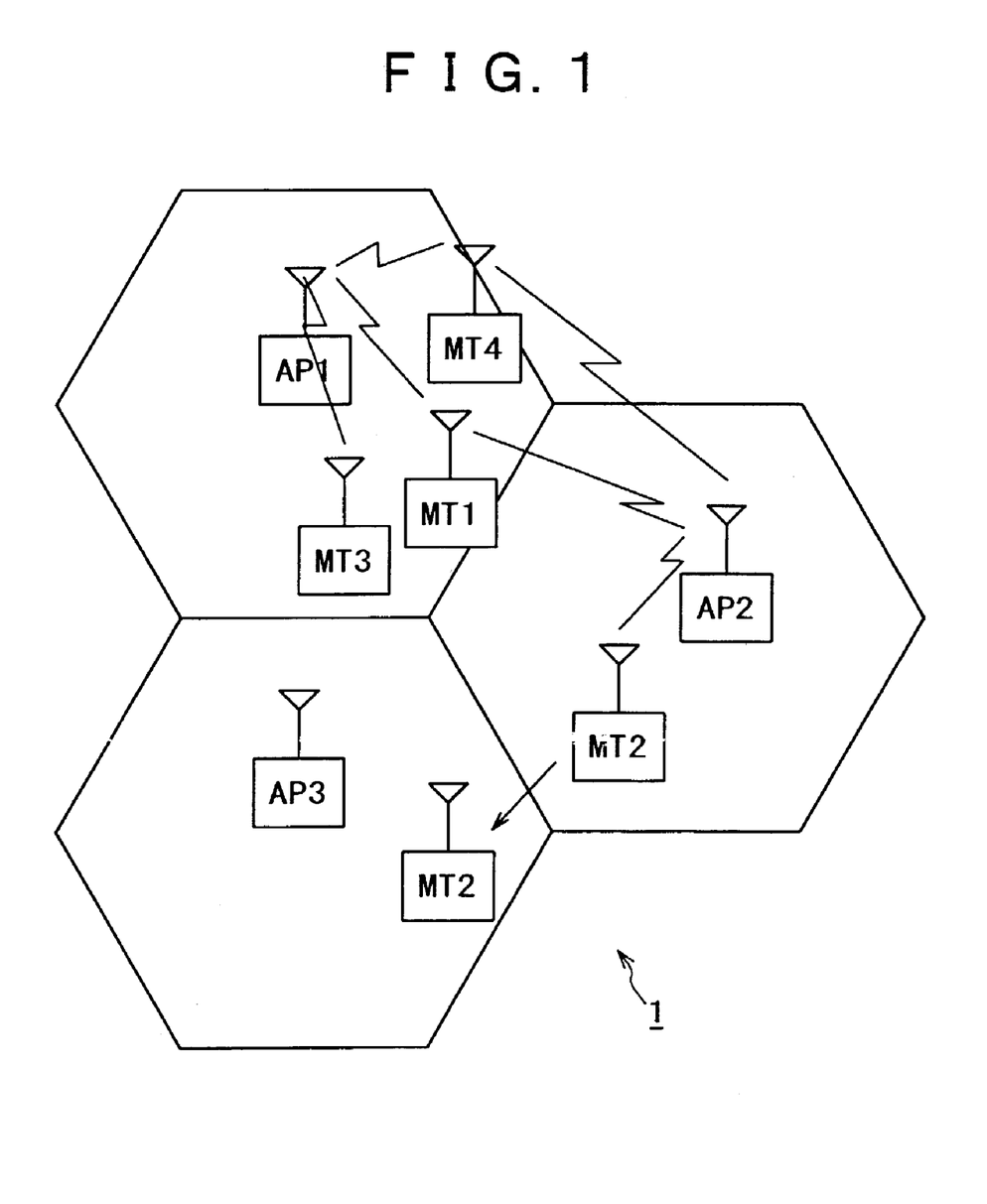
FIG. 1 is a diagram schematically showing a general construction of a radio communication system 1 according to a preferred embodiment of the present invention.

In FIG. 1, there is schematically shown a general construction of a radio communication system 1 according to a preferred embodiment of the present invention.

A radio communication system 1 is a multi-cell construction in which base stations (not shown) are disposed at predetermined intervals. In the example as shown in the figure, base stations AP1, AP2 and AP3 constitute radio communication cells, respectively. A plurality of mobile stations may be simultaneously accommodated within each cell by means of time division multiple access (TDMA). Four mobile stations MT1–MT4 perform radio communications, freely moving between the cells. However, we assume in the preferred embodiment of the present invention that the radio communication system 1 is a radio communication network of small size such as a wireless LAN and does not establish connection or synchronization between base stations.

Each base station has a channel BCH for periodically broadcasting cell information (AD-ID, TDMA frame number, TDMA frame arrangement, and the like, for example) within its cell. The mobile station receives the BCH so as to specify the cell (AP) and establish synchronization of a TDMA frame.

Figure 2:
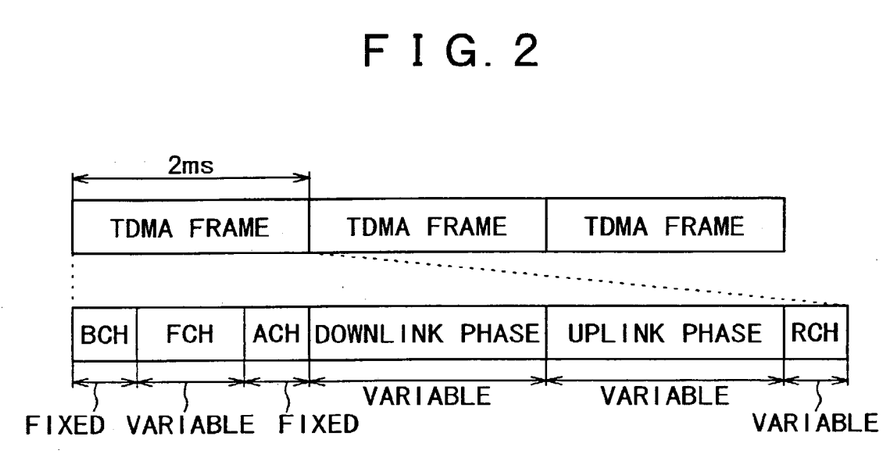
FIG. 2 is a diagram schematically showing an example a TDMA frame according to one aspect of the present invention.

In FIG. 2, there is schematically shown an example a TDMA frame arrangement (in HiperLAN/2). As shown in the figure, three types of control channels referred to as BCH (broadcast channels) for broadcasting control information for allowing the base station to establish overall control of the cell, FCH (frame control channel), and ACH (access feedback channel) are allocated to a leading head of the TDMA frame. Among them, the BCH includes information that must be received in order that the mobile station searches a cell and performs synchronization of TDMA frames.

Subsequent to the control channels, a download phase and an upload phase for performing actual data transmission are disposed, and a random access channel RCH is added to the last end. In the download phase, communication from the base station to the mobile station is carried out. In the upload phase, communication from the mobile station to the base station is carried out. For the download phase and the upload phase, allocation of time slots to is decided depending on resource reservation, for example, or other procedures.

Cells are arranged not to be isolated so that the mobile station may communicate from anywhere within a desired area. In order to avoid intra-cell signal interference around boundaries of adjacent cells, frequency channels to be used are differentiated for different cells by means of a FDMA system. Thus, the mobile station should change frequency channels each time it changes the connecting base station due to a handoff.

The control channel BCH broadcast by a control station in each cell includes information necessary to build the cell and is broadcast for each TDMA frame period. The mobile station has to receive the BCH from the base station in order to be included in the cell in order to carry out communication or in order to search a cell in the event of a handoff.

Figure 3:
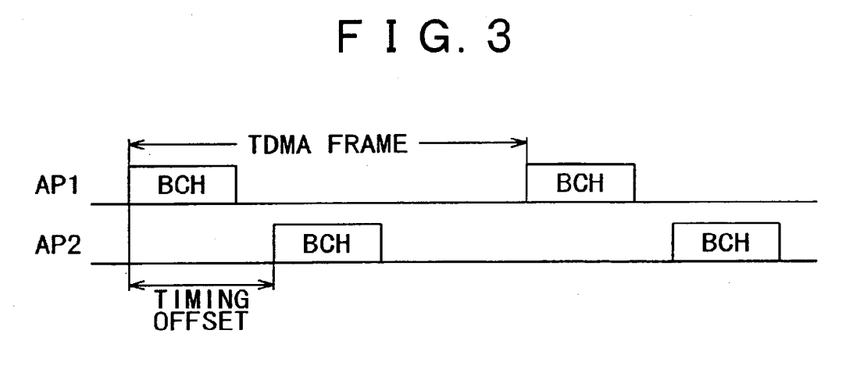
FIG. 3 is a diagram in which TDMA frames are respectively independently set in adjacent base stations AP1 and AP2 according to one aspect of the present invention.

In a small-sized radio communication system 1 such as a radio LAN, connection or synchronization between base stations is not established. In this case, synchronization of TDMA frames is not established between cells, and transmission timing of the BCH are different for different base stations. FIG. 3 shows a situation in which adjacent base stations AP1 and AP2 have each TDMA frames set independently. As shown in the figure, the TDMA frame (transmission timing of BCH) on the base station AP2 side has a timing offset which is indefinite with respect to that of the other base station AP1. As a matter of course, as there is no connection between base stations, therefore there is no mechanism provided in which the base stations directly notify an offset of transmission timing of BCH to each other.

Under such a multi-cell condition, when the mobile station performs a cell search in the event of a handoff, it is necessary to wait for a BCH coming from an adjacent cell at a reception timing different from a hitherto reception timing. In this case, if a reception timing of the BCH is not recognizable at all, it is necessary to continue its reception process until the BCH is detected. For example, in the case of HiperLAN/2, which is a radio LAN standard, a BCH is transmitted for each 2 milliseconds so that the mobile station must continue its reception operation for a maximum of 2 milliseconds. It is very disadvantageous to maintain the reception process for 2 milliseconds in view of power consumption, as already described above.

In view of such a situation, in the radio communication system 1 according to a preferred embodiment of the present invention, each mobile station notifies the base station of adjacent cell information recognized as a result of cell search carried out in the event of activation of the mobile station or a handoff, and the base station establishes centralized management thereof.

When the mobile station performs an adjacent cell search, the base station may provide them as adjacent cell information. The adjacent cell information include not only base station identification information (AP-ID) of an adjacent cell and occupied frequency channel information but also a TDMA frame offset between cells and the like. Thus, the mobile station may receive a broadcast channel of the adjacent cell by finding an appropriate reception timing based on the adjacent cell information. As a result, the mobile station does not need to perform an unnecessary reception operation in the event of the handoff, thus being effective to reduce the power consumption of the mobile station.

In the example of preferred embodiment of the present invention, each base station has a memory for storing information related to an adjacent cell, the data being reported by mobile stations within its cell. Content as shown in Table 1 below are stored in the memory. The adjacent cell information includes a base station ID (AP-ID) acquired by receiving the BCH, an occupied frequency channel (channel number), a received signal strength indicator (RSSI), a TDMA frame offset of a connection cell, and the like.

TABLE 1

| AP-ID | CH No. | RSSI | Timing/Offset value |
|---|---|---|---|
| AP2 | 2 | −70 dBm | +20 |

Each mobile station performs an adjacent cell search in advance, and notifies the result to the base station so as to share the adjacent cell information in the same cell via the base station. When it is actually necessary to switch a cell because of a handoff and the like, an adjacent cell search may be effectively achieved by controlling the reception timing based on the adjacent cell information acquired from the base station.

For example, it is assumed that a mobile station MT1 belongs to a cell of a base station AP1. MT1 performs an adjacent cell search, finding time when communication with AP1 is not carrying out (for example, idle time of a downlink phase and an uplink phase of a TDMA frame). When succeeding in reception of a BCH transmitted by AP2, MT1 reports, to AP1, content of the BCH transmitted by AP2 and a timing offset value of a TDMA frame as shown in FIG. 3.

Figure 4:
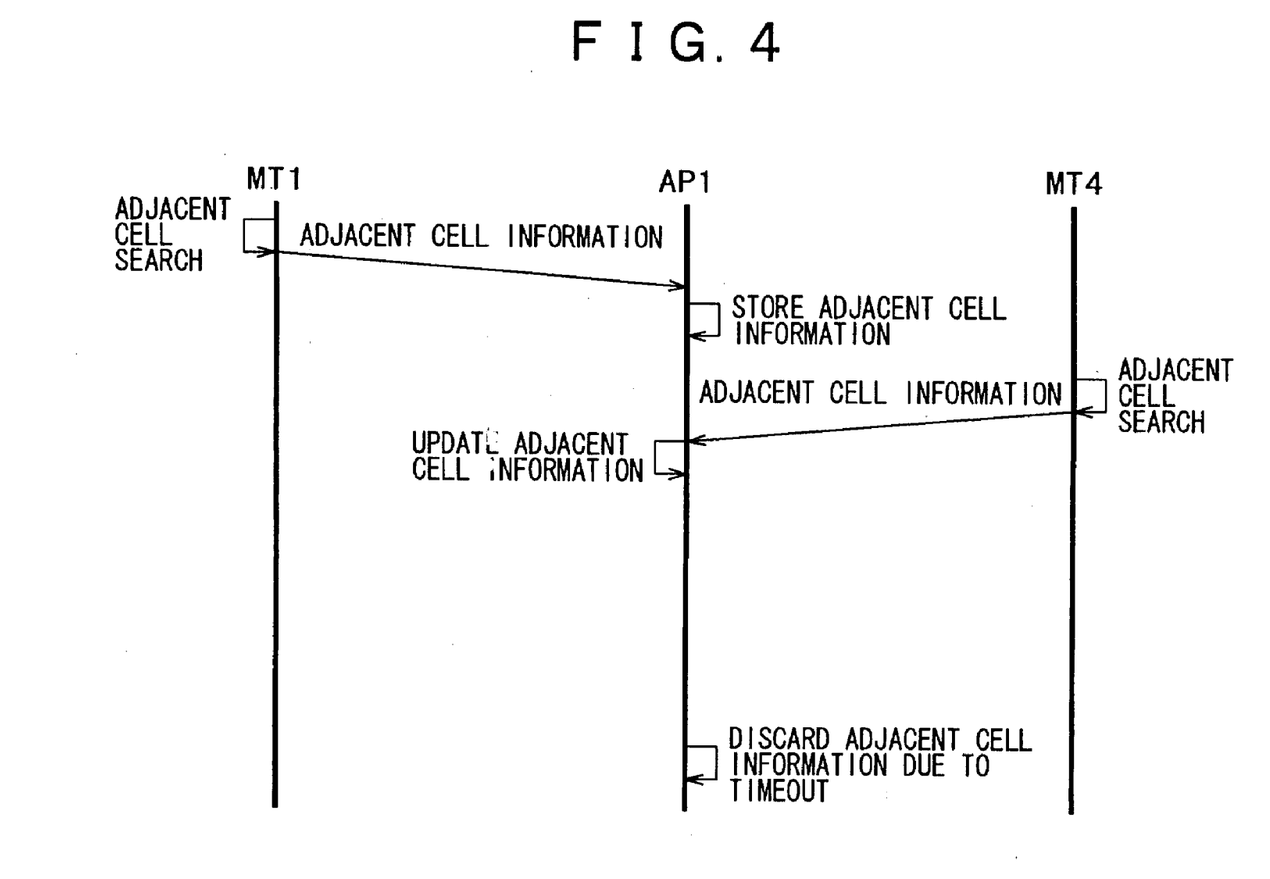
FIG. 4 is a diagram schematically showing an operational sequence in which the base station collects results of adjacent cell searches from each mobile station so as to manage adjacent cell information according to one aspect of the present invention.

On the other hand, AP1, having received the report on the adjacent cell search, stores this data in a memory available for the AP1, in a manner as shown in Table 1. In addition, after receiving the report from MT1, when AP1 receives a report on AP2 from MT4 (belonging to AP1) having similarly performed an adjacent cell search and determines that the report from MT4 is more recent than the report from MT1, the information in Table 1 may be replaced with information reported by MT4. Further, AP1 may manage the remaining periods of information by means of a timer so as to delete not so recent adjacent cell information from Table 1. FIG. 4 schematically shows an operation sequence regarding this event.

Alternatively, MT1 may report to AP1 the result of the adjacent cell search for performing an actual handoff. Firstly, MT1 provides AP1 with an execution notice in advance, then MT1 performs an adjacent cell search. When MT1 succeeds in reception of a BCH transmitted by AP2, MT1 reports to AP1 content of the BCH transmitted by AP2 and the timing offset value of the TDMA frame as shown in FIG. 3.

In this manner, AP1 maintains and manages information about the adjacent cells reported by each mobile station scattered in the cell. As a result, the information may be shared in the same cell via the base station.

The base station AP1 broadcasts the information related to these adjacent cells, acquired from each mobile station in the cell, by means of the BCH or another control channel in an effort to share the adjacent cell information in the cell. Receiving such broadcast data, each mobile station stores the adjacent cell information as shown in Table 1 in its own local memory in a similar way to the base station AP1. In this case, each mobile station in the cell may have the adjacent cell information in advance.

Figure 5:
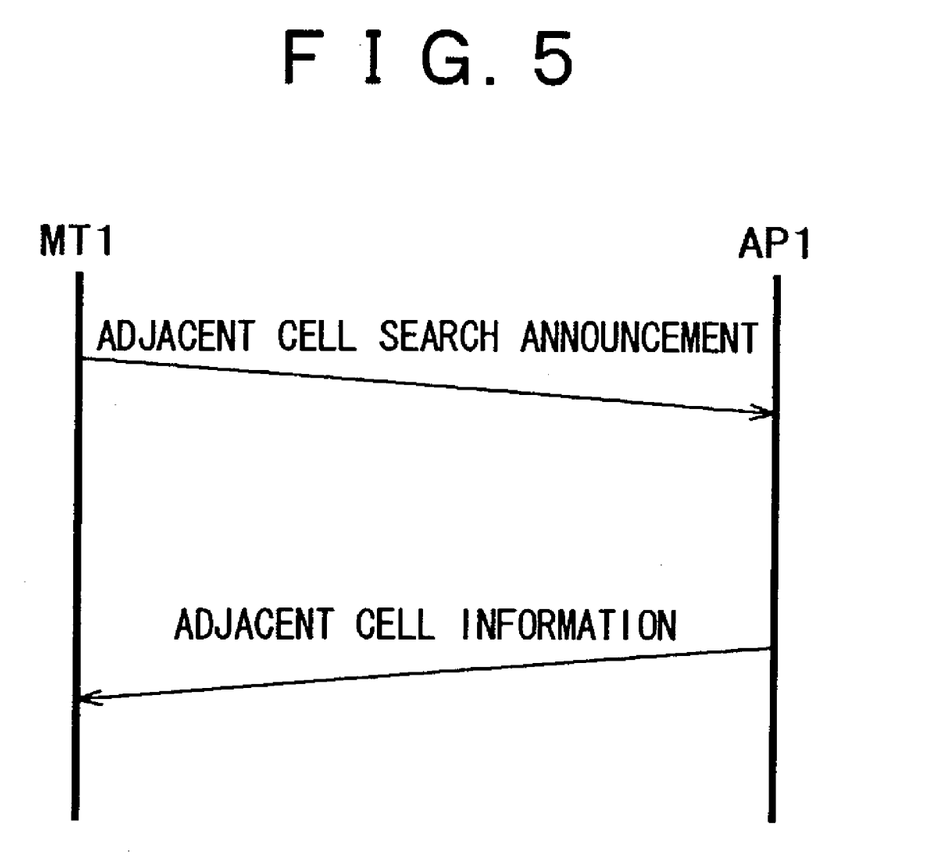
FIG. 5 is a diagram showing an operational sequence in which the base stations transmit the adjacent cell information in response to a cell search notice from the mobile station according to one aspect of the present invention.

Alternatively, by means of a procedure as shown in FIG. 5, the base station AP1 may transmit the adjacent cell information to a mobile station MT. In other words, the mobile station MT1 trying a handoff because of low communication quality and the like, sends an advance notice of an adjacent cell search to the base station AP1. In response, the base station AP1 transmits the adjacent cell information already acquired from each mobile station in the cell with destination to the mobile station MT1.

In this manner, the mobile station that acquired the adjacent cell information from another mobile station may have information on the transmission time of the adjacent AP according to the timing offset value of the TDMA frame. As a result, the mobile station carries out a standby for reception in accordance with the BCH transmission timing of the adjacent cell, the timing being calculated from the timing offset value, so as to be enabled to receive the BCH of the adjacent cell. In other words, it is not necessary to continue the reception process during the TDMA frame until the BCH is detected.

A reliability of the information related to adjacent cells managed by the base station is determined by how often the base station receives reports on the adjacent cells from how many of mobile stations. In the case of a base station accommodating many mobile stations therein, if a frequency of an adjacent cell search (refer to FIG. 4 and FIG. 5) carried out by each mobile station accommodated therein is low, the number of times of adjacent cell searches carried out in the whole cell is relatively large. As a result, the base station may frequently update the adjacent cell information, so that the reliability of the adjacent cell information is increased.

Further, in order to increase the frequency of reports on the adjacent cell information, it is necessary not only to rely on the adjacent cell search carried out by a mobile station in its cell but also to receive an original information of the cell from another mobile station which has moved in (i.e., handed off from another cell. For example, in the example as shown in FIG. 1, when a mobile station MT2 moves from the cell of the base station AP2 to the cell of the base station AP3, the mobile station MT2 sends a report on the cell information of AP2 to the base station AP3 to which the mobile station MT2 is connected to.

Figure 6:
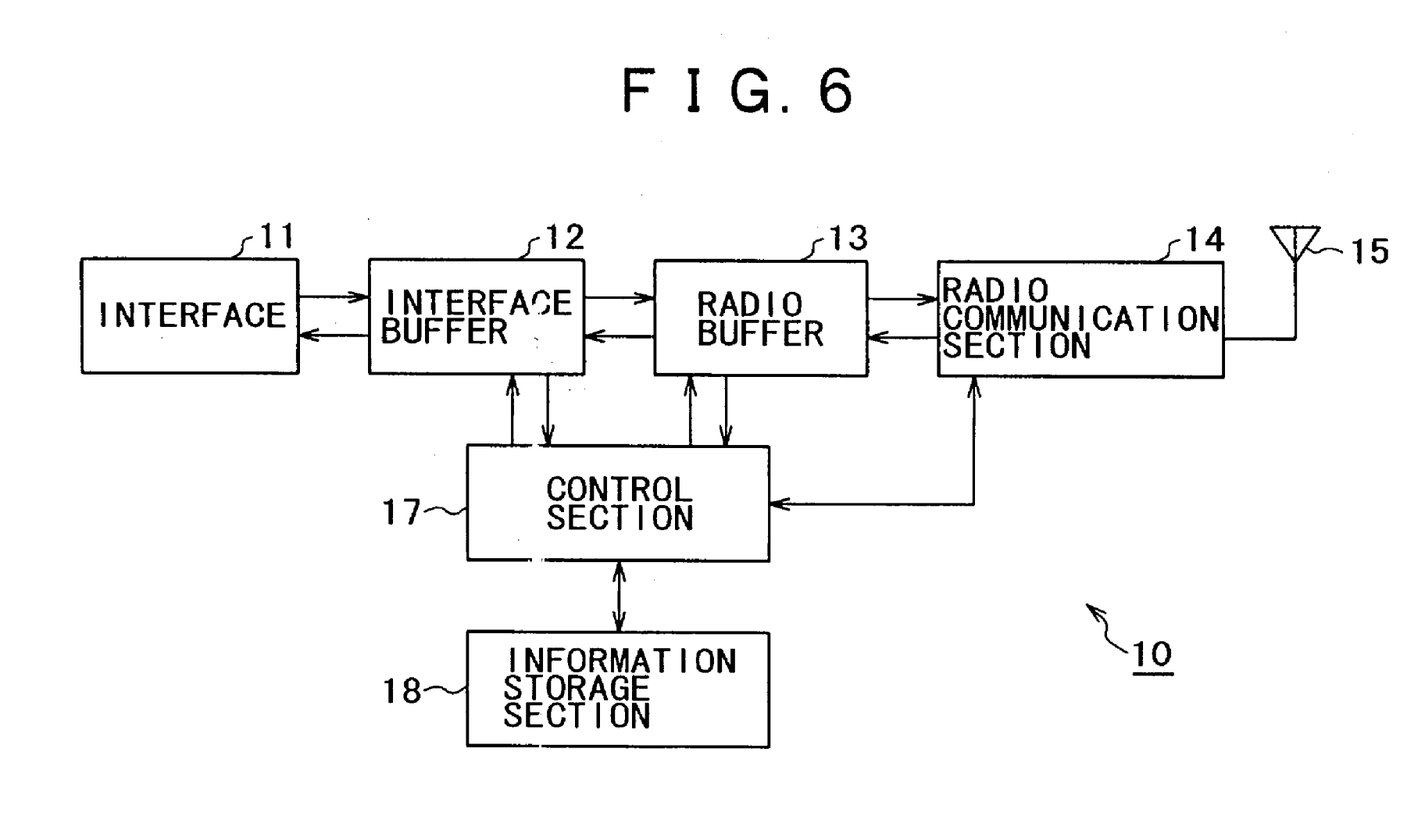
FIG. 6 a block diagram schematically showing a radio communication apparatus 10 capable of operating as a base station and a mobile station in a radio communication system 1 according to a preferred embodiment of the present invention.

In FIG. 6, there is schematically shown a block diagram of a radio communication apparatus 10 capable of operating as a base station and a mobile station in the radio communication system 1 according to a preferred embodiment of the present invention.

As shown in the figure, the radio communication apparatus 10 comprises an interface 11, an interface buffer 12, a wireless buffer 13, a radio communication section 14, an antenna 15, a control section 17, and an information storage section 18, which may however be replaced with another construction performing the same functions as the construction shown in the figure and therefore not limited to the example shown herein.

The radio communication apparatus 10 performs a data transmission process between each other radio communication apparatus under an integrated control by the control section 17 and a multi-cell condition. The control section 17 is constituted by a microprocessor and controls operations of the apparatus with respect to radio communications under the multi-cell condition in such a manner as to execute process instructions (program code) stored in the information storage section 18.

The radio communication system 1 according to the preferred embodiment of the present invention performs data transmission in the TDMA system within the cell using a predetermined frequency channel for each cell. When the radio communication apparatus 10 operates as a base station, the control section 17 prepares a broadcast channel BCH describing control information such as a base station ID, a TDMA frame number, a TDMA frame format, and the like, so as to periodically broadcast the BCH by using a leading area of the TDMA frame.

On the other hand, when the radio communication apparatus 10 operates as a mobile station, it is accommodated within the cell which transmitted the received BCH (or the BCH of the highest received signal strength indicator RSSI) and performs identification of the base station, setting of a frequency channel to be used, synchronization of the TDMA frame, and the like, according to the description of the BCH. A time domain to be used in the TDMA frame is allocated according to a procedure such as resource reservation, for example.

In order to perform data transmission, the control section 17 is constructed to temporarily store transmission data in the radio buffer 13 for radio transmission so that the data are wirelessly transmitted from the antenna 15 via the radio communication section 14.

In addition, a signal received by the radio communication apparatus 10 is provided to the radio communication section 14 via the antenna 15, decoded, and temporarily stored in the radio buffer 13. Then the control section 17 reconstructs and transfers information received by the TDMA frame period to the interface buffer 12. In addition, the interface 11 is so arranged as to transfer the information as having a predetermined interface format to an external device (not shown).

When the radio communication apparatus 10 operates as a mobile station, the control section 17 performs identification of a connection base station, setting of a frequency channel to be used, synchronization of the TDMA frame, and the like, according to the description of the received BCH (or the BCH of the highest received signal strength indicator RSSI). In addition, the control section 17 executes an adjacent cell search in the event of a handoff or by making use of idle time of the TDMA frame and commands the radio communication section 14 to transmit the result of adjacent cell search to the base station.

When the radio communication apparatus 10 operates as a base station, the control section 17 orders the radio communication section 14 to broadcast the BCH periodically according to a self-determined TDMA frame period. In addition, when receiving adjacent cell information from each mobile station within the cell, the radio communication apparatus 10 interprets the data and store them in an adjacent cell information table (see Table 1) within the information storage section 18. When adjacent cell information on the same cell is received from a plurality of mobile station, the adjacent cell information may be updated as needed. If a predetermined time is elapsed after a latest update, such old adjacent cell information may be deleted.

Within the same cell, the adjacent cell information table stored in the base station is shared by mobile stations within the cell. For example, in response to a request from a mobile station which is going to perform an adjacent cell search due to a handoff and the like, the control section 17 reads the adjacent cell information out of the information storage section 18 so as to transmit the information to the mobile station. The control section 17 may broadcast the adjacent cell information by means of the BCH or other control channels.

In addition, when the radio communication apparatus 10 operates as a mobile station, the adjacent cell information received from the connection base station is stored in the information storage section 18. The adjacent cell information includes timing offset values of TDMA frames between cells. When performing an adjacent cell search in the event of a handoff and the like, the control section 17 finds a reception timing of BCH from the adjacent cell according to the adjacent cell information and orders the radio communication section 14 to perform a reception process. As a result, it is possible to receive the BCH of the adjacent cell at an appropriate timing and without having to perform an unnecessary reception operation in the event of the handoff, thus the present example of preferred embodiment of the present invention being effective to reduce power consumption as compared to the prior art.

Figure 7:
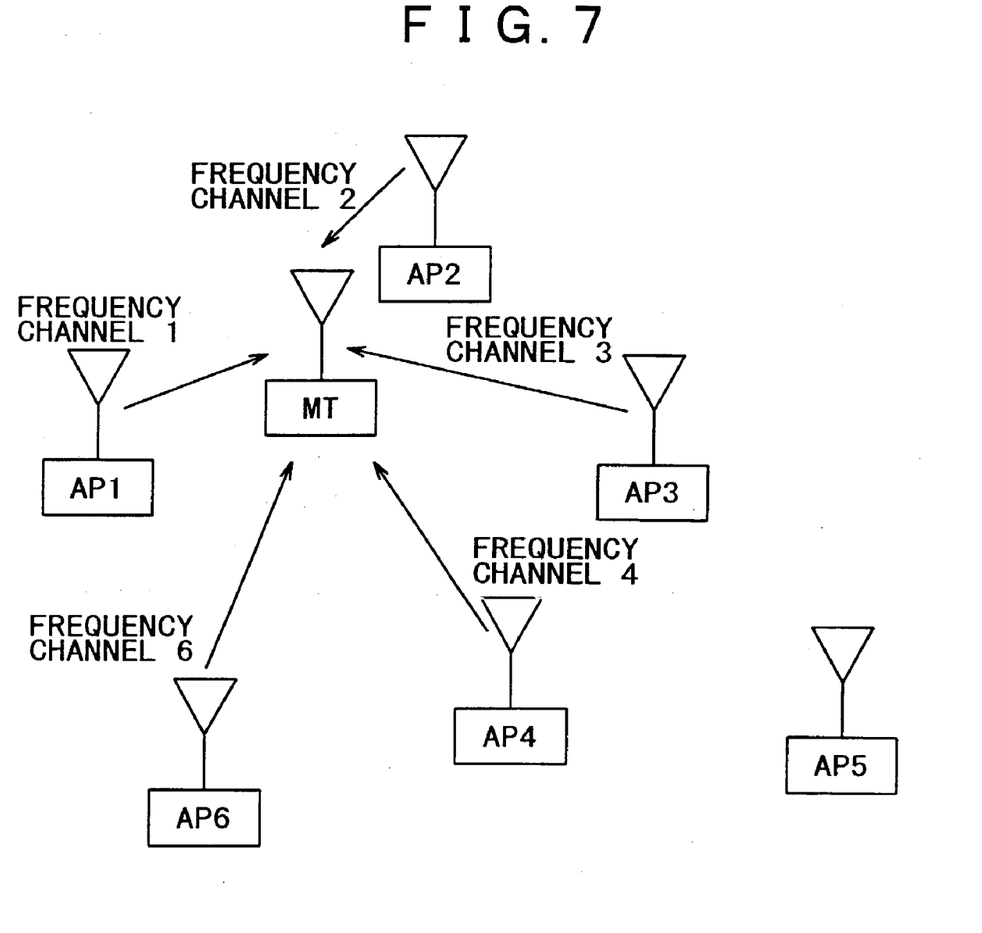
FIG. 7 is a diagram showing an example of construction of a multi-cell radio communication environment according to one aspect of the present invention.

In addition, a case is considered below, where a mobile station MT is activated under the multi-cell radio communication environment where cells are respectively constituted by six adjacent (or neighboring) base stations 1–6 (with reference to FIG. 7).

Figure 8:
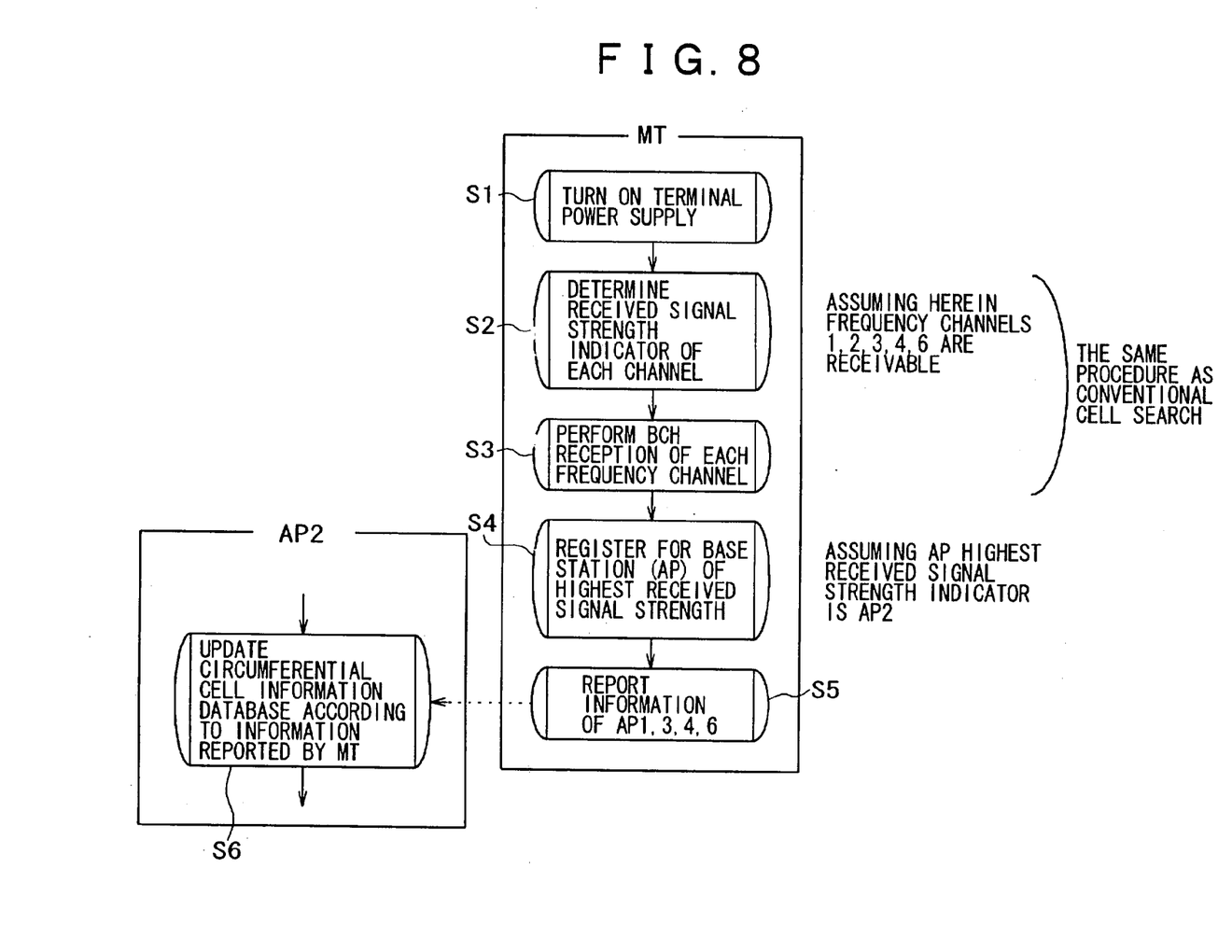
FIG. 8 is a flow chart showing an operating procedure when a mobile station MT is activated under a multi-cell radio communication environment according to a preferred embodiment of the present invention.

In FIG. 8 there is shown an operating procedure, in a flow chart form, in which a mobile station MT is activated under a multi-cell radio communication environment according to a preferred embodiment of the present invention. The operating procedure is achieved such that the control section 17 of each radio communication apparatus 10 operating a mobile station and a base station executes a predetermined program code.

When turning a mobile station terminal on, in step S1, firstly the mobile station MT measures a received signal strength indicator RSSI for each frequency channel and operates an adjacent cell search, in step S2. In this example, we assume it has detected that reception is possible in the frequency channels 1, 2, 3, 4, and 6.

Secondly, the mobile station MT receives a BCH of each frequency channel in step S3, and stores the thus acquired adjacent cell information in the information storage section 18. Then it identifies a base station of the highest received signal strength indicator out of the successfully received BCH's and carries out registration in the cell, in step S4. In this example, it is assumed that the received signal from the base station AP2 has a highest strength and that MT is registered in the cell of AP2. A procedure of cell registration per se does not directly relate to the gist of the present invention, and therefore the description thereof will be omitted herein.

According to the preferred embodiment of the present invention, the mobile station MT further reports adjacent cell information with respect to the rest of base stations AP1, AP3, AP4, and AP6 whose BCH's have been successfully received to the base station AP2 in which the registration was carried out, in step S5.

On the base station AP2 side where the mobile station MT has been registered, an update of a circumferential cell information database (with reference to Table 1) stored in the information storage section 18 is carried out according to the reported adjacent cell information, in step S6.

As a matter of course, the mobile station MT acquires adjacent cell information by similarly performing an adjacent cell search not only when turning on the power supply but also making use of the idle time in any of TDMA frames so that it may report the adjacent cell information to the registered base station AP2. Each mobile station in the cell of the base station AP2 similarly provides with a report of adjacent cell information so that the adjacent cell information or the circumferential cell information database may be managed exclusively through the base station AP2. The more the number of mobile stations accommodated within the cell is, the higher the number of times of adjacent cell searches executed in the cell is, thereby increasing the reliability of the information database of the circumferential cells.

In this manner, adjacent cell information collected in the base station is shared by each mobile station in the cell. In other words, the base station broadcasts the adjacent cell information acquired from each mobile station in the cell by means of the BCH or another control channel in an effort to share the adjacent cell information in the cell. In response to a request from a mobile station which tries a handoff due to a reduction in communication quality and the like, the base station may transmit the adjacent cell information in order to establish information sharing.

Figure 9:
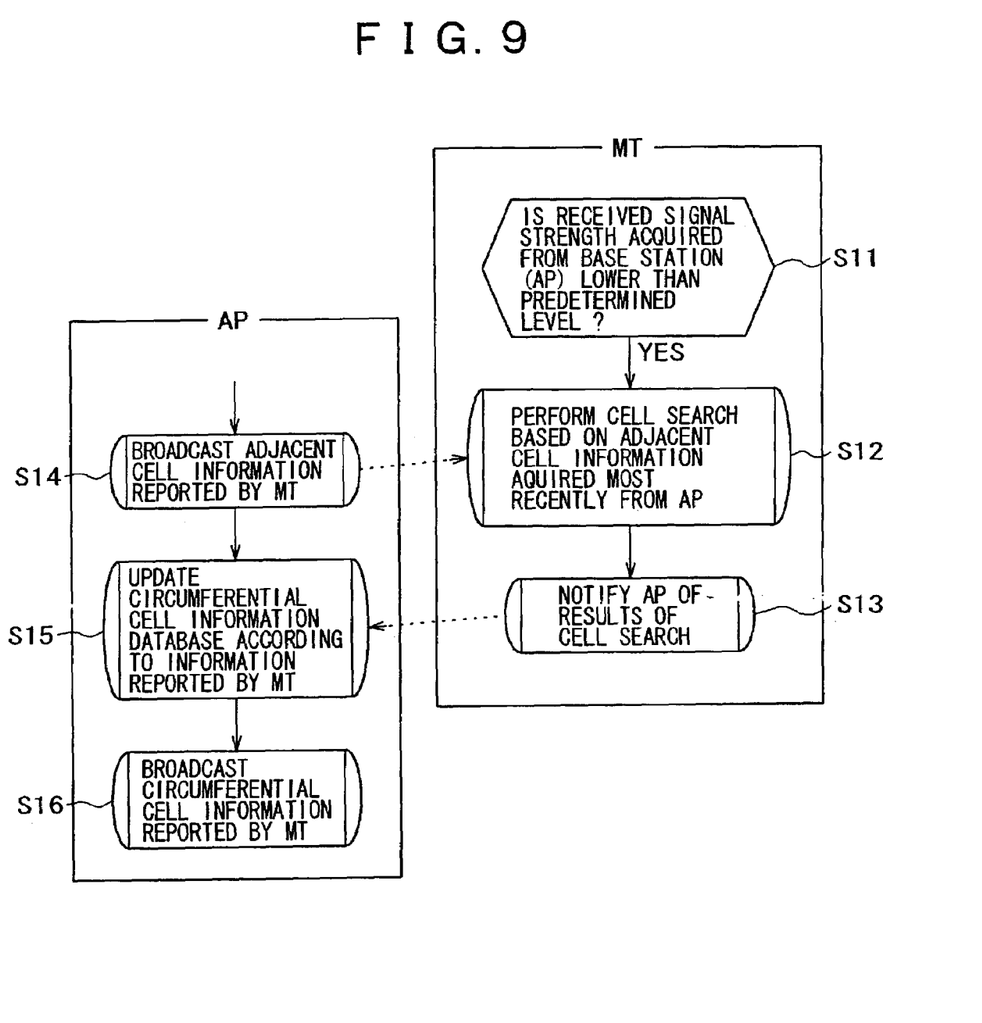
FIG. 9 is a flow chart showing procedures taken when the base station broadcasts the adjacent cell information acquired from each mobile station in the cell according to one aspect of the present invention.

In FIG. 9 there is shown an operating procedure, in a flow chart form, when the base station broadcasts the adjacent cell information acquired from each mobile station in the cell. The operating procedure is achieved such that the control section 17 of each radio communication apparatus 10 operating a mobile station and a base station executes a predetermined program code.

A base station AP broadcasts the adjacent cell information reported by each mobile station in the cell by means of the BCH or another control channel, in step S14.

On the other hand, when a received signal strength indicator RSSI received from the base station AP is lower than a predetermined level due to movement and the like, and degradation in communication quality is detected, in step S11, a mobile station MT in the cell, according to the adjacent cell information immediately previous received from the base station AP, changes a frequency channel, and calculates a BCH reception timing of an adjacent cell so as to perform an adjacent cell search or a reception process of the BCH, in step S12.

In addition, upon successful adjacent cell search, the mobile station. MT changes the connection of base station or performs a handoff and notifies the previous base station AP of the search results at this time as adjacent cell information, in step S13.

On the base station AP side, the circumferential cell information database in the information storage section 18 is updated according to the adjacent cell information reported by the mobile station MT, in step S15. Further, according to the TDMA frame period, new adjacent cell information is broadcast by means of the BCH or another control channel, in step S16.

Figure 10:
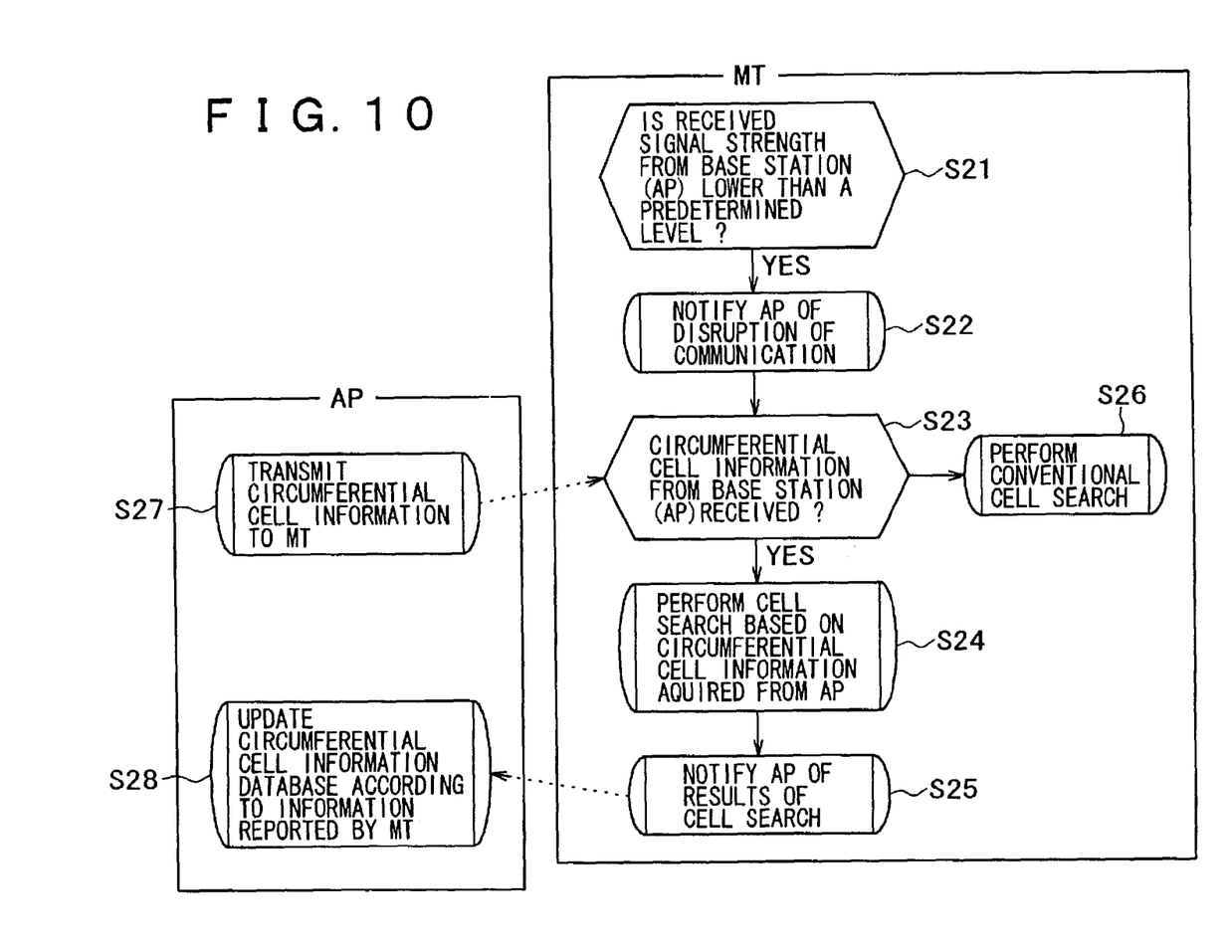
FIG. 10 is a flow chart showing procedures taken when the base station transmits the adjacent cell information in response to a notification of disruption of communication from the mobile station according to one aspect of the present invention.

In FIG. 10, there is shown an operating procedure, in a flow chart form, where the base station transmits the adjacent cell information in response to a notification of disruption of communication from the mobile station. The operating procedure is achieved such that the control section 17 of each radio communication apparatus 10 operating a mobile station and a base station executes a predetermined program code.

When a received signal strength indicator RSSI received from the base station AP is lower than a predetermined level due to move and the like, and degradation in communication quality is detected in step S21, a mobile station MT in the cell notifies the base station AP of disruption of communication in order to carry out an adjacent cell search, in step S22.

Upon reception of a request for disruption of communication from the mobile station MT in the cell, the base station AP transmits the adjacent cell information to the mobile station MT, in step S27.

When the mobile station MT cannot receive the adjacent cell information from the base station AP, in Step S23 (for example, when the information cannot be received because the mobile station has moved out of the cell), a conventional cell search is performed in step S26 so as to connect to a new base station which has been found.

When the mobile station MT successfully receives the adjacent cell information from the base station in step S23, the frequency channel is changed according to the adjacent cell information, and estimates a BCH reception timing of an adjacent cell so as to perform an adjacent cell search or a reception process of the BCH, in step S24.

In addition, upon successful adjacent cell search, the mobile station MT changes the connection to the base station or, in other words, performs a handoff, and notifies the previous base station AP of the current search results time as new adjacent cell information, in step S25.

On the base station AP side, the circumferential cell information database in the information storage section 18 is updated according to the adjacent cell information reported by the mobile station MT, in step S28. [Adendum]

The present invention has been described in detail with reference to specific examples of preferred embodiments,. However, it will be apparent for those skilled in the art to modify or substitute the embodiments without departing from the scope of the present invention. In effect, although the present invention has been disclosed by way of examples, the description in the present specification should not be construed as limiting the scope thereof

What is claimed is:

1. A multi-cell and multi-user radio communication system comprising:
 a plurality of cells having a base station enabled for communication, the cells disposed adjacent to or contiguous to one another, wherein the base station collects and manages adjacent cell information from a mobile station within a cell and provides the adjacent cell information collected within the cell to the mobile station; and
 adjacent cell information management means for managing received adjacent cell information and updating the adjacent cell information if receiving adjacent cell information regarding a same adjacent cell from a plurality of mobile stations, wherein:
 communication is carried out in each cell by means of a time division multi access system and each base station transmits intra-cell control information at a time division multiple access frame period within the cell; and
 the adjacent cell information includes a timing offset value of time division multi access frames of its own cell and an adjacent cell,
 wherein the mobile station carries out reception of intra-cell control information from the adjacent cell at a reception timing which is determined from the timing offset value included in the adjacent cell information acquired from the base station, during an adjacent cell search.

2. A radio communication apparatus operating as a base station under a radio communication environment where intra-cell communications are carried out by means of a time division multiple access system, the radio communication apparatus comprising:
 an adjacent cell information reception means for receiving adjacent cell information notified by each mobile station within a cell;
 an adjacent cell information management means for managing the received adjacent cell information;
 an adjacent cell information provision means for providing an adjacent cell information stored in the adjacent cell information management means to a mobile station within the cell, wherein the adjacent cell information management means updates the adjacent cell information if receiving adjacent cell information regarding a same adjacent cell from a plurality of mobile stations; and
 cell management means for transmitting a control channel including intra-cell control information for each time division multi access frame period of its own cell, wherein the adjacent cell information include a timing offset value of time division multi access frames of its own cell and the adjacent cell.

3. The radio communication apparatus as claimed in claim 2, wherein the adjacent cell information management means discards the adjacent cell information upon elapse of a period of time after latest reception.

4. The radio communication apparatus as claimed in claim 2, wherein the adjacent cell information provision means broadcasts the adjacent cell information within the cell.

5. The radio communication apparatus as claimed in claim 2, wherein the adjacent cell information provision means transmits the adjacent cell information to a mobile station within the cell in response to an advance search notice from the mobile station or a request in another format.

6. A radio communication method for operation as a base station under a radio communication environment where intra-cell communications are carried out by means of a time division multiple access system, the radio communication method comprising:
 an adjacent cell information reception step for receiving adjacent cell information notified by each mobile station within a cell;
 an adjacent cell information management step for managing the received adjacent cell information;
 an adjacent cell information provision step for providing an adjacent cell information stored in the adjacent cell information management step to a mobile station within the cell, wherein the adjacent cell information management step includes updating the adjacent cell information if receiving adjacent cell information regarding a same adjacent cell from a plurality of mobile stations; and a cell management step for transmitting a control channel including intra-cell control information for each time division multi access frame period of its own cell, wherein the adjacent cell information include a timing offset value of time division multi access frames of its own cell and the adjacent cell.

7. A radio communication apparatus operating as a mobile station under a radio communication environment where intra-cell communications is carried out by means of a time division multiple access system, the apparatus comprising:
an adjacent cell search means for searching an adjacent cell;
an adjacent cell information notification means for notifying a base station of the adjacent cell information acquired as a result of the adjacent cell search;
an adjacent cell information acquisition means for acquiring the adjacent cell information from the base station; and
including means for updating the adjacent cell information if receiving adjacent cell information regarding a same adjacent cell from a plurality of mobile stations, wherein:
a base station within each cell transmits a control channel including intra-cell control information at a time division multiple access frame period within the cell; and
the adjacent cell information notification means notifies the base station of adjacent cell information acquired through the adjacent cell search and including a timing offset value of time division multi access frames of its own cell and the adjacent cell,
wherein the adjacent cell search means tries reception of a control channel transmitted by an adjacent cell.

8. The radio communication apparatus as claimed in claim 7, wherein the adjacent cell search means carries out adjacent cell search at a time of activation of the apparatus, when quality of communication with the base station is reduced, or when there is a free area in a time division multiple access frame.

9. The radio communication apparatus as claimed in claim 7, wherein the adjacent cell search means carries out a reception process of the control channel from the adjacent cell at a reception timing which is determined from the timing offset value included in the adjacent cell information acquired by the adjacent cell information acquisition means.

10. The radio communication apparatus as claimed in claim 7, wherein the adjacent cell information acquisition means acquires adjacent cell information that is transmitted included in the control channel.

11. The radio communication apparatus as claimed in claim 7, wherein the adjacent cell information acquisition means requests the base station to transmit the adjacent cell information in response to a decrease in quality of communication with the base station.

12. A radio communication method for operation as a mobile station under a radio communication environment where intra-cell communication is carried out by means of a time division multiple access system, the method comprising:
an adjacent cell search step for searching an adjacent cell;
an adjacent cell information notification step for notifying a base station of the adjacent cell information acquired through the adjacent cell search; and
an adjacent cell information acquisition step for acquiring the adjacent cell information from the base station, and updating the adjacent cell information if receiving adjacent cell information regarding a same adjacent cell from a plurality of mobile stations, wherein:
a base station within each cell transmits a control channel including intra-cell control information at a time division multiple access frame period within the cell; and
the adjacent cell information notification step notifies the base station of adjacent cell information acquired through the adjacent cell search and including a timing offset value of time division multi access frames of its own cell and the adjacent cell,
wherein the adjacent cell search step tries reception of a control channel transmitted by an adjacent cell.

13. A computer program described in computer-readable form to make a computer execute a process of operation as a base station under a radio communication environment where intra-cell communication is carried out by means of a time division multiple access system, the program comprising:
an adjacent cell information reception step for receiving adjacent cell information notified by each mobile station within a cell;
an adjacent cell information management step for managing the received adjacent cell information; and
an adjacent cell information provision step for providing an adjacent cell information stored in the adjacent cell information management step to a mobile station within the cell, and updating the adjacent cell information if receiving adjacent cell information regarding a same adjacent cell from a plurality of mobile stations; and
a cell management step for transmitting a control channel including intra-cell control information for each time division multi access frame period of its own cell, wherein the adjacent cell information include a timing offset value of time division multi access frames of its own cell and the adjacent cell.

14. A computer program described in computer-readable form to make a computer execute a process of operation as a mobile station under a radio communication environment where intra-cell communications are carried out by means of a time division multiple access system, the program comprising:
an adjacent cell search step for searching an adjacent cell;
an adjacent cell information notification step for notifying a base station of the adjacent cell information acquired as a result of the adjacent cell search; and
an adjacent cell information acquisition step for acquiring the adjacent cell information from the base station, and updating the adjacent cell information if receiving adjacent cell information regarding a same adjacent cell from a plurality of mobile stations, wherein:
a base station within each cell transmits a control channel including intra-cell control information at a time division multiple access frame period within the cell;
the adjacent cell information notification step notifies the base station of adjacent cell information acquired through the adjacent cell search and including a timing offset value of time division multi access frames of its own cell and the adjacent cell; and
the adjacent cell search step tries reception of a control channel transmitted by an adjacent cell.

* * * * *